United States Patent
Kawabata et al.

[11] Patent Number: 6,072,259
[45] Date of Patent: Jun. 6, 2000

[54] STATOR FOR ELECTRIC MOTOR

[75] Inventors: Yasutomo Kawabata; Tetsuya Miura, both of Aichi-ken; Ryuji Toh, Toyota; Masaru Hirako, Toyota; Akio Fukui, Toyota, all of Japan

[73] Assignee: Toyota Jidosha Kabushiki Kaisha, Toyota, Japan

[21] Appl. No.: 09/075,222

[22] Filed: May 11, 1998

[30] Foreign Application Priority Data

| May 14, 1997 | [JP] | Japan | 9-123925 |
| Jun. 12, 1997 | [JP] | Japan | 9-154760 |

[51] Int. Cl.[7] .............................. H02K 1/12; H02K 1/06; H02K 1/00
[52] U.S. Cl. ........................................... 310/216; 310/254
[58] Field of Search ..................................... 310/215, 216, 310/254, 260

[56] References Cited

U.S. PATENT DOCUMENTS

| 1,397,363 | 11/1921 | Cole | 310/215 |
| 2,970,237 | 1/1961 | Kent | 310/260 |
| 3,097,320 | 7/1963 | Koehly et al. | 310/217 |
| 3,495,109 | 2/1970 | Ames | 310/71 |
| 3,882,336 | 5/1975 | Boyd et al. | 310/216 |
| 4,161,669 | 7/1979 | Aimar | 310/194 |
| 4,386,288 | 5/1983 | Laurie | 310/260 |
| 4,400,639 | 8/1983 | Kobayashi et al. | 310/215 |
| 4,808,872 | 2/1989 | Lund et al. | 310/215 |
| 5,191,698 | 3/1993 | Sumi et al. | 310/216 |
| 5,194,775 | 3/1993 | Cooper | 310/260 |
| 5,304,885 | 4/1994 | Wong et al. | 310/216 |
| 5,306,976 | 4/1994 | Beckman | 310/215 |
| 5,477,096 | 12/1995 | Sakashita et al. | 310/216 |
| 5,763,978 | 6/1998 | Uchida et al. | 310/215 |

FOREIGN PATENT DOCUMENTS

| 2512599 | 3/1983 | France | 310/215 |
| 55-19466 | 2/1980 | Japan | |
| 58-183054 | 12/1983 | Japan | |
| 587567 | 1/1978 | Russian Federation | 310/260 |

*Primary Examiner*—Clayton LaBalle
*Attorney, Agent, or Firm*—Oblon, Spivak, McClelland, Maier & Neustadt, P.C.

[57] ABSTRACT

A stator core for a motor in which a member with rounded edges is used to prevent the electrical breakdown of the winding of a coil which may occur at a slot edge therein. End plates 18 are disposed on ends of the stator core 10 formed of laminated magnetic steel plates 12. Each of the end plates 18 has substantially the same pattern as each magnetic steel plate 1, viewed from the axis of the motor. The elongate surface 18a of the end plate 18 continues smoothly from the inner surface 16a of each of slots 16 to the rounded edge surface 18b. The rounded edge surface extends smoothly from the elongate surface 18a to the end surface 18c of the end plate 18. This structure can eliminate sharp edges from the fringe of the slot 16, thus preventing the electrical breakdown of a coated conductor 22 in the coil which may occur at the edges.

8 Claims, 11 Drawing Sheets

STATOR FOR ELECTRIC MOTOR

BACKGROUND OF THE INVENTION

1. Field of the Invention

The present invention relates to the structure of a stator for an electric motor, and more particularly to a structure for providing an electrical insulation between the stator core and windings forming coils. The present invention also relates to a method for fabricating the stator core of an electric motor, and more particularly to a stator core fabricating method preferable to achieve a reliable electrical insulation to the coil.

2. Description of the Related Art

Motors commonly include stators, each including a stator core and coils formed by winding plural pieces of wire (conductors). The stator core is usually formed by laminating annular magnetic steel plates each which has its inner side formed in a comb-like pattern. The teeth arranged in a comb-like pattern act as a magnetic pole. A coil is formed by winding wire conductors around a tooth though each slot or groove. The magnetic steel plate is formed through an accurate punching process. This process tends to produce burrs around the edge of the magnetic steel plate. Conductors coated with insulation layers tend to be damaged by the burrs of the magnetic steel plate. Conventionally, in order to prevent damages of the insulating layers, an insulation paper is inserted between the inner surface in the slot and the conductor. Japanese Laid-open Utility Model publication No. Sho 58-183054 discloses the technique of forming an insulating layer on the slot surfaces of a stator core to secure good electrical insulation.

The edge around the fringe of the magnetic steel plate is sharp and may include burrs as described above. Particularly, since conductors, when being wound around the stator, are strongly in contact with the edge of the slot at the end of a stator, the insulation layer thereon is prone to be easily damaged. It has been difficult to form an insulating layer thick equal to that on the flat portion on the edge of the stator core, even by using the technique disclosed in the above-mentioned publication, so that the insulation layers coated on the conductor is possibly damaged at the edge of the slot or the corner. Hence, a reliable electrical insulation cannot be sufficiently secured at the critical portion.

SUMMARY OF THE INVENTION

The present invention is made to solve the above-mentioned problems. Moreover, the objective of the invention is to provide the stator for a motor that can secure an excellent electrical insulating property at the edge of each of slots formed at the ends thereof. Another objective of the present invention is to provide a method of fabricating a stator core that can secure an excellent electrical insulating property at the edge of each of slots formed at the ends thereof.

According to one aspect of the present invention, a stator for an electric motor comprises a stator core body formed of magnetic steel plates, each of the magnetic steel plates comprising teeth and grooves arranged in a comb-like pattern inside thereof, the magnetic steel plates being laminated so as to align the teeth and the grooves thereof; coils respectively inserted into slots formed by grooves continuously laminated in the stator core body; and rounded edge forming members disposed on end surfaces in the laminated direction of the stator core body, each of the rounded end forming members having an elongated surface substantially extending without a difference in level from the inner surface of each of the slots and having a rounded edge surface with a predetermined curvature radius which smoothly continues with the elongated surface and is formed in a protruded pattern with respect to the slot. Moreover, the stator core body and said rounded edge forming member are coated with an insulating layer at least at portion where said stator core body and said rounded edge forming member are in contact with a coil.

Since the rounded edge forming member can eliminate sharp edges in the slot, the conductor on the edge producing an electrical breakdown due to its sharp edges can be prevented. Moreover, since the thick insulating layer can be sufficiently coated, even on the edge in the stator core, it can be prevented that a breakage of the film coated on the conductor causes an electrical breakdown over the whole of the stator core.

Moreover, each of the rounded edge forming members may include a parallel portion parallel to the magnetic steel plates and a brim portion nearly perpendicular to the parallel portion and extending toward the center portion of the stator core body. The stator core body has grooves which receives the brim portion at a portion corresponding to the brim portion. The brim portion continues substantially and smoothly along the inner surface of each of the slots. The brim can position the rounded edge forming member to the stator core.

Furthermore, the stator core may further comprise connection members which are disposed on the ends of said stator core body, each of the connection members having teeth each smaller than each of pole pieces formed of the laminated teeth in the comb-like pattern and shaped in a similar comb-like pattern to that of each of the magnetic steel plates; and the rounded edge forming member covers each of the connection members. Hence, the connection member can securely fix the rounded edge forming member to the end surface of the stator core body.

Moreover, the connection member may comprise at least one first connection plate disposed on the ends of the stator core body, each of the first connection plate having teeth each smaller than each of pole pieces formed of the laminated teeth in the comb-like pattern and shaped in a similar comb-like pattern to that of each of the magnetic steel plates; and at least one second connection plate disposed further outside the first connection plate, the second connection plate having teeth each smaller than each of the pole pieces and larger than the teeth of the first connection plate and shaped in a similar comb-like pattern to that of each of the magnetic steel plates.

Thus, the rounded edge forming member can be securely fixed on the end surfaces of the stator core body by means of the first coupling plate and the second coupling plate. Moreover, the rounded edge forming member may be an insulating material. In this case, the slot end can be more securely electrically insulated.

Moreover, according to another aspect of the present invention, a method for fabricating a stator core for an electric motor comprises the steps of forming a stator core body by laminating magnetic steel plates, each of the magnetic steel plates having a cross section in a comb-like pattern of teeth; disposing connection members disposed on the ends of the stator core body, each of the connection members having teeth each larger than each of pole pieces formed of the laminated teeth in the comb-like pattern of the stator core body and having teeth in a similar comb-like pattern to that of each of the magnetic steel plates; forming a rounded edge forming member which covers the connection member by injecting a resin material into a cavity defined by the end surface of a mold and the end surface of the stator core body; forming the rounded edge forming member; and separating the rounded edge forming member from the mold. The rounded edge forming member has an elongated surface substantially extending without a difference in level from the inner surface of each of the slots being grooves in the stator core body and has a rounded edge surface with a predetermined curvature radius which smoothly continues with the elongated surface and is formed in a protruded pattern with respect to the slot.

Moreover, the connection member arranging step may comprise the steps of disposing at least one first connection plate disposed on the ends of the stator core body, each of first connection plate having teeth each smaller than each pole piece formed of the laminated teeth in the comb-like pattern and shaped in a similar comb-like pattern to that of each of the magnetic steel plates; and disposing at least one second connection plate disposed further outside the first connection plate, the second connection plate having teeth each smaller than the pole pieces and larger than the teeth of the first connection plate and shaped in a similar comb-like pattern to that of each of the magnetic steel plates.

Moreover, according to another aspect of the present invention, a method of fabricating a stator core for an electric motor comprises the steps of laminating magnetic steel plates to form a stator core body with a cross section in a comb-like pattern of teeth; filling a resin to a cavity defined by the end surface of a mold and an end surface of the stator core body and then forming a cap extending in the direction of the laminated magnetic steel plates, the cap having substantially the same cross section as the stator core body; and separating the stator core body from the mold. Thus, a cap can be easily formed at a stator core end by filling the cavity defined by the mold and the stator core body with a resin material. The cap can be flexibly and desirably shaped using a mold. For example, an electrical breakdown of the coil conductor caused by burrs at the edge around the magnetic steel plate can be prevented by means of the cap smoothly continuing with the inner surface of the slot. An electrical breakdown of the turned coil conductor can be prevented by rounding the edge of cap end to the groove.

Moreover, the insulation film forming step may comprise the steps of heating the stator core body on which the rounded edge forming member is formed, at a predetermined temperature; immersing the heated stator core body into a solution of an insulation material to coat the insulation material on the stator core body; and heating the stator core body on which the insulation material is coated to cure the coated resin.

Since the viscosity of a resin around the stator core is decreased by previously heating a stator core and then dipping it into a solution of an insulation material, adhesion of excess resin to the stator core can be prevented.

BRIEF DESCRIPTION OF THE DRAWINGS

This and other objects, features, and advantages of the present invention will become more apparent from the following detailed 10 description and drawings, in which.

DESCRIPTION OF THE PREFERRED EMBODIMENTS

Preferred embodiments of the present invention will be described below with reference to the attached drawings.

Figure 1:
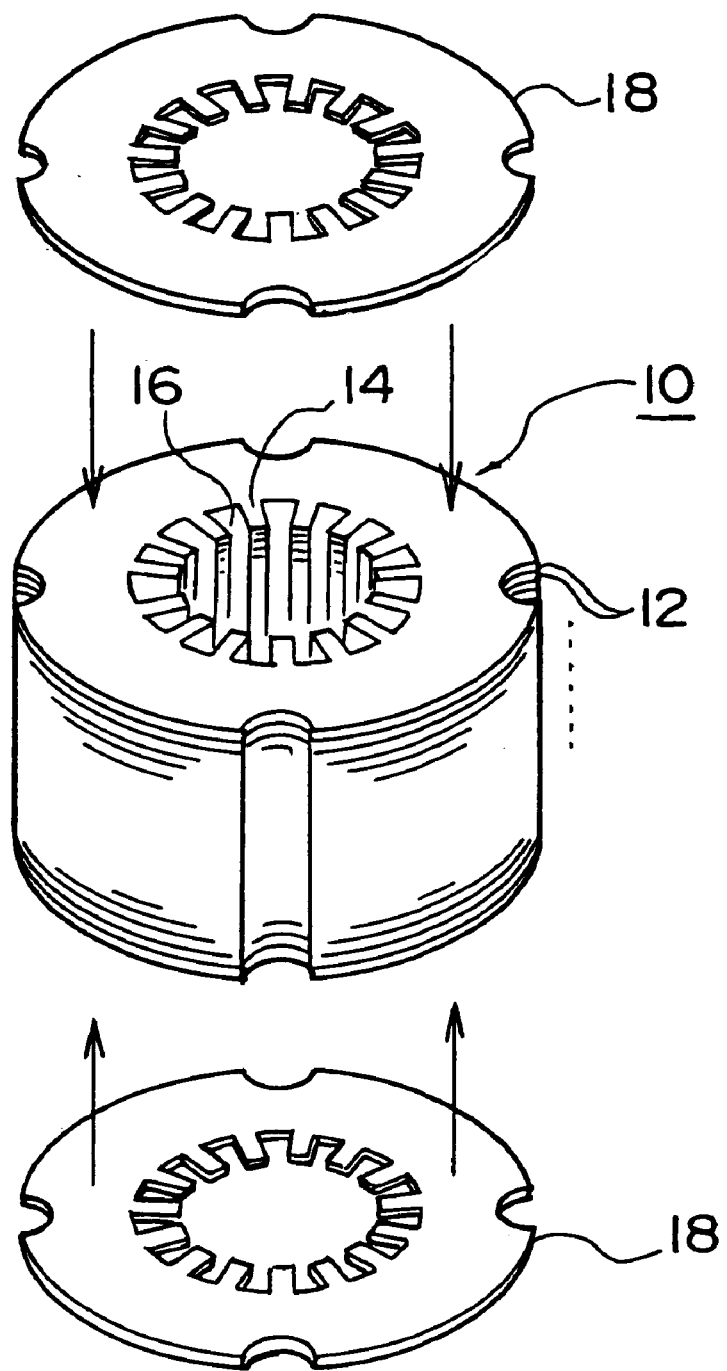
FIG. 1 is an outline view showing a stator core according to a first embodiment of the present invention.

FIG. 1 is an outline view schematically illustrating a stator core according to a first embodiment of the present invention. Referring to FIG. 1, a stator core 10 consists of a structure in which a predetermined number of annular magnetic steel plates 12, each of which has the inner area where teeth are arranged in a comb-like pattern, are laminated so as to align the teeth with one another. By laminating the teeth arranged in the comb-like pattern, pole pieces 14 are formed while slits 16 into which coil windings are respectively inserted are defined. End plates 18 each acting as a rounded edge forming member are disposed on the ends of the stator core 10, that is, the upper end and the lower end thereof in FIG. 1. The end plate 18 has the same annular form as the magnetic steel plate 12 and includes the center portion where teeth arranged in a comb-like pattern. The arrangement of the teeth is the same as that of the magnetic steel plate 18. Hence, the end plates 18 are placed on the both ends of the stator core 10 in such a way that the teeth are aligned with the pole pieces 14 and the grooves aligns with the slots 16. In this arrangement, the inner peripheral surface of the comb-like arranged teeth of the stator core 10 and the inner peripheral surface of the comb-like arranged teeth of the end plates 18 are finished so as to provide no difference in level between the stator core 10 and the end plates 18.

Figure 2:
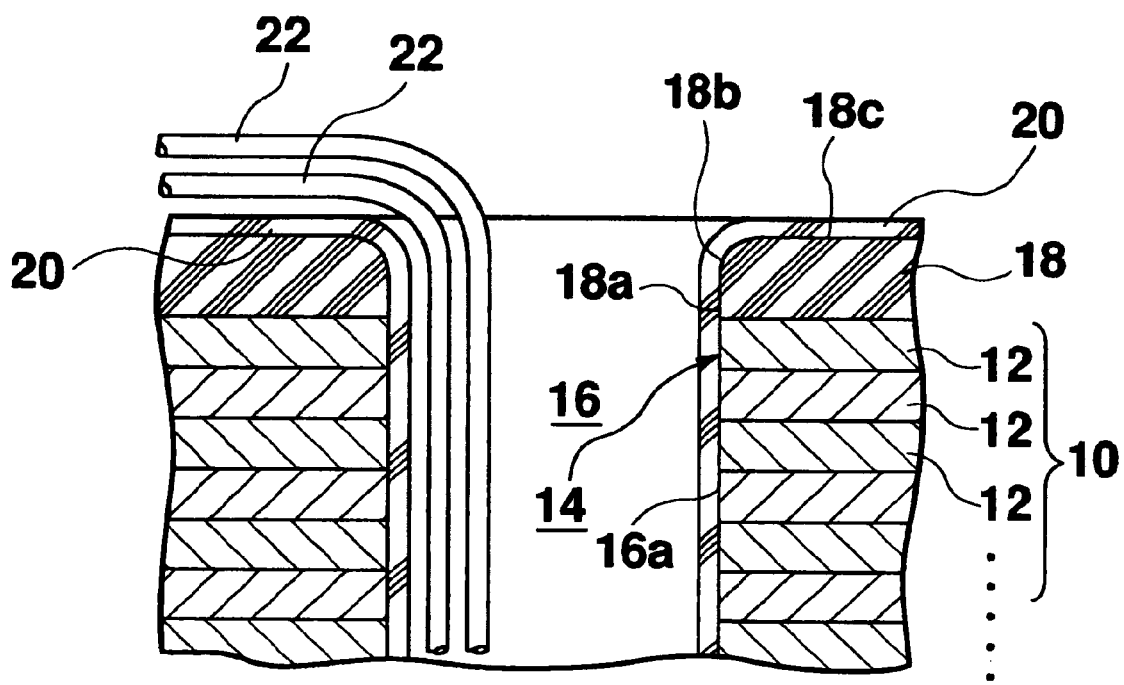
FIG. 2 is a cross-sectional view partially illustrating the major portion of the stator core shown in FIG. 1.

Unlike the magnetic steel plate 12, the end plate 18 is relatively thicker and one edge around the fringe of the groove has a rounded surface. The detail of the end plate 18 is partially shown in FIG. 2. FIG. 2 partially illustrates one slot 16 of the stator core 10 formed of a laminated structure of the magnetic steel plates 12 and a magnetic pole 14 adjacent to the slot 16. The end plate 18 is further disposed on either end of the stator core 10. The end plate 18 is somewhat thicker than the magnetic steel plate 12. In the end plate 18, the inner surface of the groove includes an elongate surface 18a smoothly elongated from the inner surface 16a of the slot 16 at the side in contact with the stator core 10 and a rounded edge surface 18b with a predetermined curvature formed at the corner on the opposite side of the stator core 10. The corner rounded surface 18b smoothly connects the elongate surface 18a and the flat end surface 18c of the end plate 18. In the present embodiment, the cross section is a curved surface being an arc of a predetermined curvature.

An insulating layer 20 of a predetermined thickness is formed over the integrated structure of the stator core 10 and the end plate 18. The insulating layer can be formed through a powder coating or dip coating process. The coated conductor 22 forms a coil wounding around the magnetic pole 14 so as to be housed in the slot 16.

The coated conductor 22 is wound from the slot 16 to a neighbor slot or a slot away a predetermined distance from the slot 16. The conductor 22 is much bent at the edge of the slot 16 as shown in FIG. 2. A sharp edge at the corner may damage the insulation layer of the coated conductor. Since an insulation layer with the same thickness as that on other flat portions cannot be formed at the sharp edge, the base materials (such as magnetic steel plates) may be exposed. According to the present embodiment, an end plate 18, which has the rounded edge with a curved surface 18b along which coated conductors are bent, is disposed at the end of the stator core 10. Thus, the thickness of the insulation layer 20 at the corner can be set to the same thickness as that on the slot inner surface 16a or the end surface 18c of the end plate. Since a sharp edge is not formed because of the rounded surface 18b, damage to the insulation coat of the coated conductor 22 due to the edge can be prevented. Moreover, since the coated conductor 22 is not locally deformed, breakage of the insulation coat due to the deformation can be prevented. As described above, since the insulating layer 20 is sufficiently thickened at the corner of the stator core, the electrical insulation to the stator core 10 can be secured, even if the insulation coat of the coated conductor 22 is broken.

In the present embodiment, because the curvature of the rounded edge surface 18b is sufficienly large, the thickness of the end plate 18 is somewhat larger than that of the magnetic steel plate 12. In other words, if the curvature of the rounded edge surface can be secured to an extent of occurrence of no breakdown, the thickness of the end plate 18 can be equal to or less than the thickness of the magnetic steel plate 12.

Experiments indicated that, in order to prevent damage of the insulation coat due to deformation of the coated conductor itself, it is preferable to set the curvature radius of the rounded edge surface 18b to at least the radius of the coated conductor 22. The end plate 10 of an insulation material can provide electrical insulation between the stator core 10 and the conductor 22, even if the insulating layer 20 should be damaged.

Figure 3:
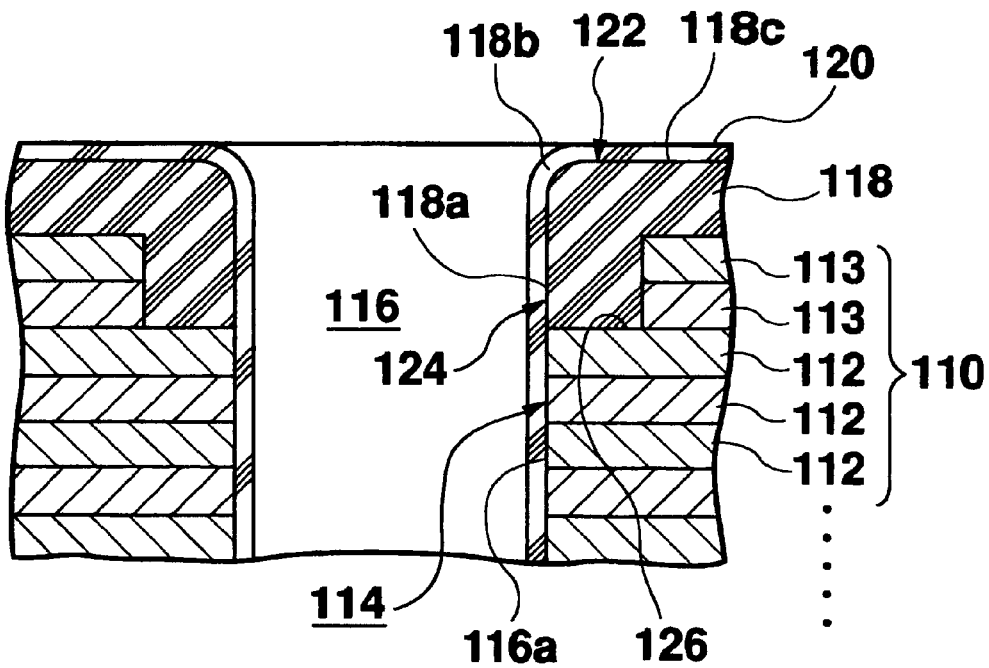
FIG. 3 is a cross-sectional view partially illustrating the major portion of the stator core according to a second embodiment.

FIG. 3 is a cross sectional view partially illustrating the main configuration of a stator core according to a second embodiment of the present invention. According to this embodiment, end plates are disposed on the end surfaces of a stator core formed of laminated steel plates, like the first embodiment. The stator core is characterized by the configuration of the end plates and the configuration of magnetic steel plates to the end plates.

The stator core 110 is formed by laminating first magnetic steel plates 112 each having the same shape as the magnetic steel plate 12 in the first embodiment and a predetermined number of second magnetic steel plates 113 disposed on the ends of the stator core 110 and each having a somewhat smaller width than each of the teeth arranged in the comb-like pattern. As in first embodiment, pole pieces 114 and slots 116 are arranged in the comb-like pattern. the end plates 118 resemble those in the first embodiment in that they are disposed on the ends of the stator core 110, except the shape thereof. The end plate 118 has a parallel portion 122 which is placed in parallel to the magnetic steel plates 112 and 113 and a brim portion 124 being perpendicular to the parallel portion 122 and extending toward the center portion of the stator core 110. The parallel portion 122 has the same shape as the end plate 18 in the first embodiment. The brim portion 124 is formed so as to fit the step portion 126 formed by the difference in diameter between the magnetic steel plates 112 and 113. The size of each of the brim 124 and the magnetic steel plates 112 and 113, as well as the number of the magnetic steel plates 113, is determined in such a way that the inner surface of the brim 124 continues with the slot inner surface 16a defined by the magnetic steel plates 112 with no difference in level. Hence, the surface of the brim 124 facing the slot 116 provides an elongate surface 118a smoothly connected to the slot inner surface 116a. A rounded edge surface 118b is formed on the corner of the slot 116 where the parallel portion 122 intersects the brim 124 to smoothly connect the elongate surface 118a with the end surface 118c of the parallel portion 122. Like the first embodiment, the rounded edge surface 118b has a fixed curvature. However, if the rounded edge surface 118b has a curvature smoothly connecting two surfaces 118a and 118c, the condition is not limited to the above-mentioned embodiment. An insulating layer 120 is formed over the stator core 110 integrated with the end plates 118 through a powder coating process or dip coating process.

The present embodiment can provide the same advantage as the first embodiment. The electrical breakdown of the coated conductors can be prevented by rounding the edge around the fringe of the slot 116. The end plate 118 of an insulating material can secure the electrical insulation between the stator core 110 and the conductor even if the insulating layer 20 should be broken. Moreover, according to the present embodiment, the brim 124 can certainly position the end plates 118 to the stator core 110 and can prevent the end plate 118 to be displaced upon winding conductors.

Figure 4:
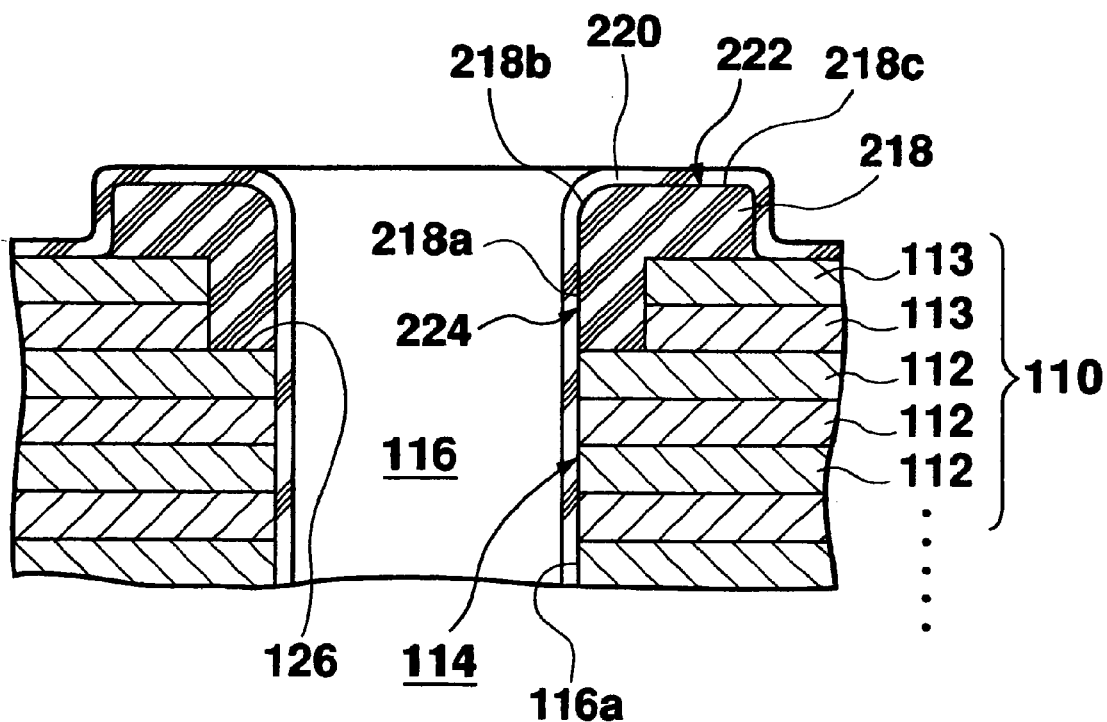
FIG. 4 is a cross-sectional view partially illustrating the major portion of the stator core according to a third embodiment.

FIG. 4 is a cross sectional view partially illustrating a stator core according to a third embodiment of the present invention. As in second embodiment, a slot end in a stator and a pole piece adjacent to the slot end are partially shown in FIG. 4. The same numerals represent the same constituent elements as those described in the above embodiments, and their description will not be duplicated here.

The present embodiment is characterized in that the end plate 118 in the second embodiment is replaced with the end bush 218 as a rounded edge forming member. The end bush 218 is placed around only the fringe of the slot 116. The bush 218 has a parallel portion 222 disposed in parallel to the magnetic steel plates 112 and 113 and a brim portion 224 which is perpendicular to the parallel portion 222 and extends toward the center portion of the stator core 110. The brim portion 224 is formed so as to fit the step portion defined by the difference in size between the magnetic steel plates 112 and 113. The size of each of the brim portion 124 and magnetic steel plates 112 and 113, as well as the number of the magnetic steel plates 113, are determined in such a way that the brim portion 224 is smoothly continuous to the slot inner surface 116a defined by the magnetic steel plates 112. Hence, the surface of the brim 224 facing the slot 116 becomes an elongate surface 218a smoothly connected with the inner surface 116a. The elongate surface 218a and the rounded edge surface 218b smoothly connected with the end surface 218c of the parallel portion 222 are formed on the fringe of the slit 116.

As in the two embodiments above, the rounded edge surface 218b of the present embodiment has a curved surface of a fixed curvature. However, even if the curved surface 218b smoothly connects the surface 118a to the surface 118c, the curvature is not limited to the embodiments. An insulating layer 220 is formed to the stator core 110 integrated with the end surface bush 218 through a powder coating process or dip coating process.

This embodiment can provide the same advantage as those in the above-mentioned embodiments. The breakdown of the coated conductor can be prevented by rounding the edge around the fringe of the slot 116. The end bush 218 of an insulating material can maintain electrical insulation between the stator core 110 and the conductor, even if the insulating layer 220 should be broken. Like the second embodiment, the brim 224 in the present embodiment can certainly position the bush 218 to the stator core 110 and can prevent the coil to be displaced upon winding conductors. Moreover, according to the present embodiment, the rounded edge forming member, which is disposed only on the slot fringe portion, can suppress an increase in weight.

Figure 5:
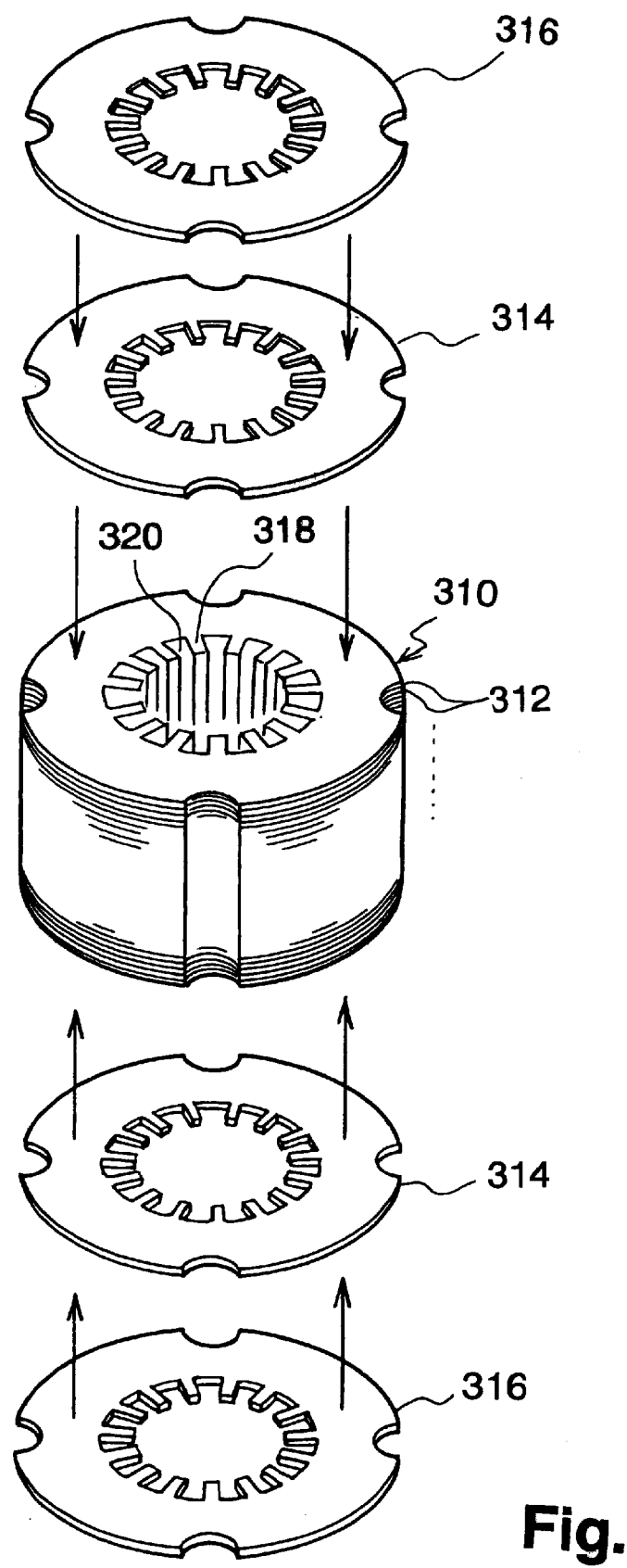
FIG. 5 is a disassembled perspective view illustrating a stator core body and connection members according to a fourth embodiment.

FIGS. 5 to 8 are views of the configuration of a stator core according to a fourth embodiment of the present embodiment. FIG. 5 is a disassembled perspective view illustrating a stator core body 310 and first and second connection plates 314 and 316 each being a connection member according to the present embodiment. The stator core body 310 is formed of a laminated structure of a predetermined number of annular magnetic steel plates 312. Each magnetic steel plate 312 has teeth internally arranged in a comb-like pattern. The magnetic steel plates are stacked so as to align the teeth punched in a comb-like pattern layer by layer. First and second connection plates 314 and 316 are disposed on the ends of the stator core. Pole pieces 318 are defined by a lamination of the teeth formed in a comb-like pattern. The grooves define the slot 320 which receives a coil winding.

Figure 6:
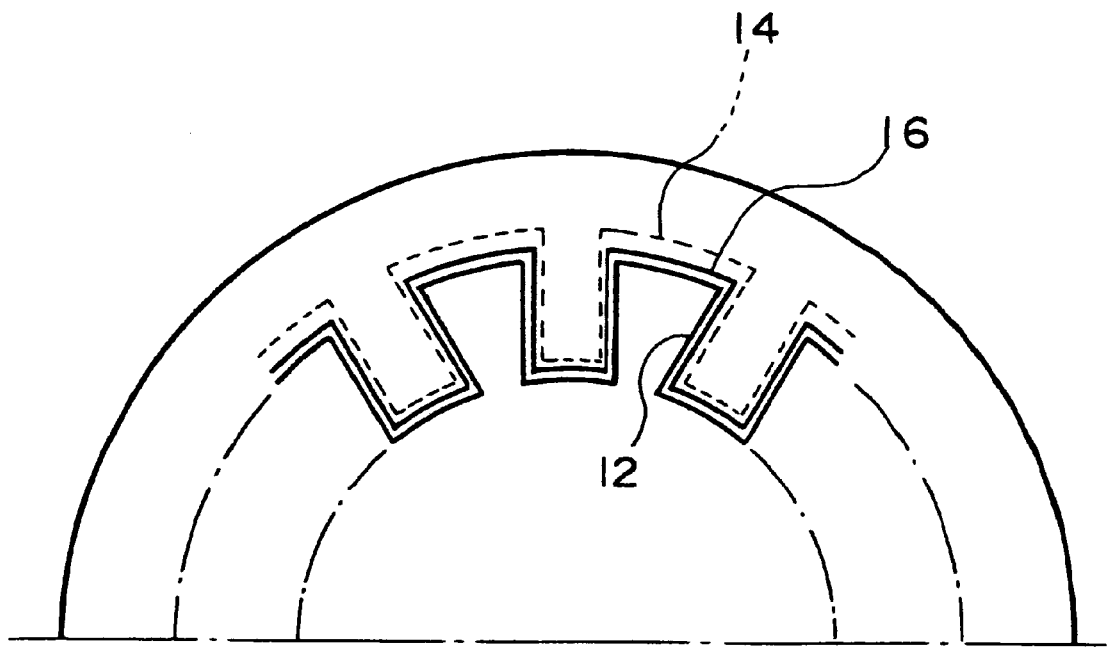
FIG. 6 is a view illustrating in detail an end surface of the stator core body of FIG. 5.
Figure 7:
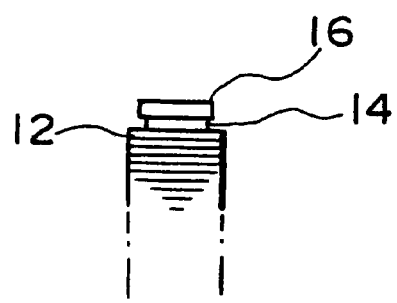
FIG. 7 is a view illustrating in detail an end surface of the stator core body of FIG. 5.

FIGS. 6 and 7 respectively show in detail the first connection plate 314 and the second connection plate 316. The first connection plate 314 is similar to the magnetic steel plate 312, that is, an annular piece in which the inner portion includes teeth arranged in a comb-like pattern. Each of the teeth in a comb-like pattern of the first connection plate 314 has a somewhat narrower width than that of the magnetic steel plate 312. The envelope curve by the front ends of the teeth has a relatively large radius. The entire size of the first connection plate 314 is formed smaller. The envelope curve by the bottom ends of the grooves of the first connection plate 314 has relatively a large radius than that of the magnetic steel plate 312. The first connection plate 314 has a deeper notch as a whole. The second connection plate 316 is a similar piece to the magnetic steel plate 312 or the first connection plate 314. The width of each tooth is set to an intermediate value between the width of the magnetic steel plate 312 and the width of the first connection plate 314. Hence, portion of the first connection plate 314, as shown in FIG. 7, is most narrow. In the embodiment, the first connection plate 314 and the second connection plate 316 are formed of the same material as that of the magnetic steel plate 312. The stator core body 310 is integrated with the connection members by laminating the magnetic steel plate 312, the first connection plate 314 and the second connection plate 316.

Figure 8:
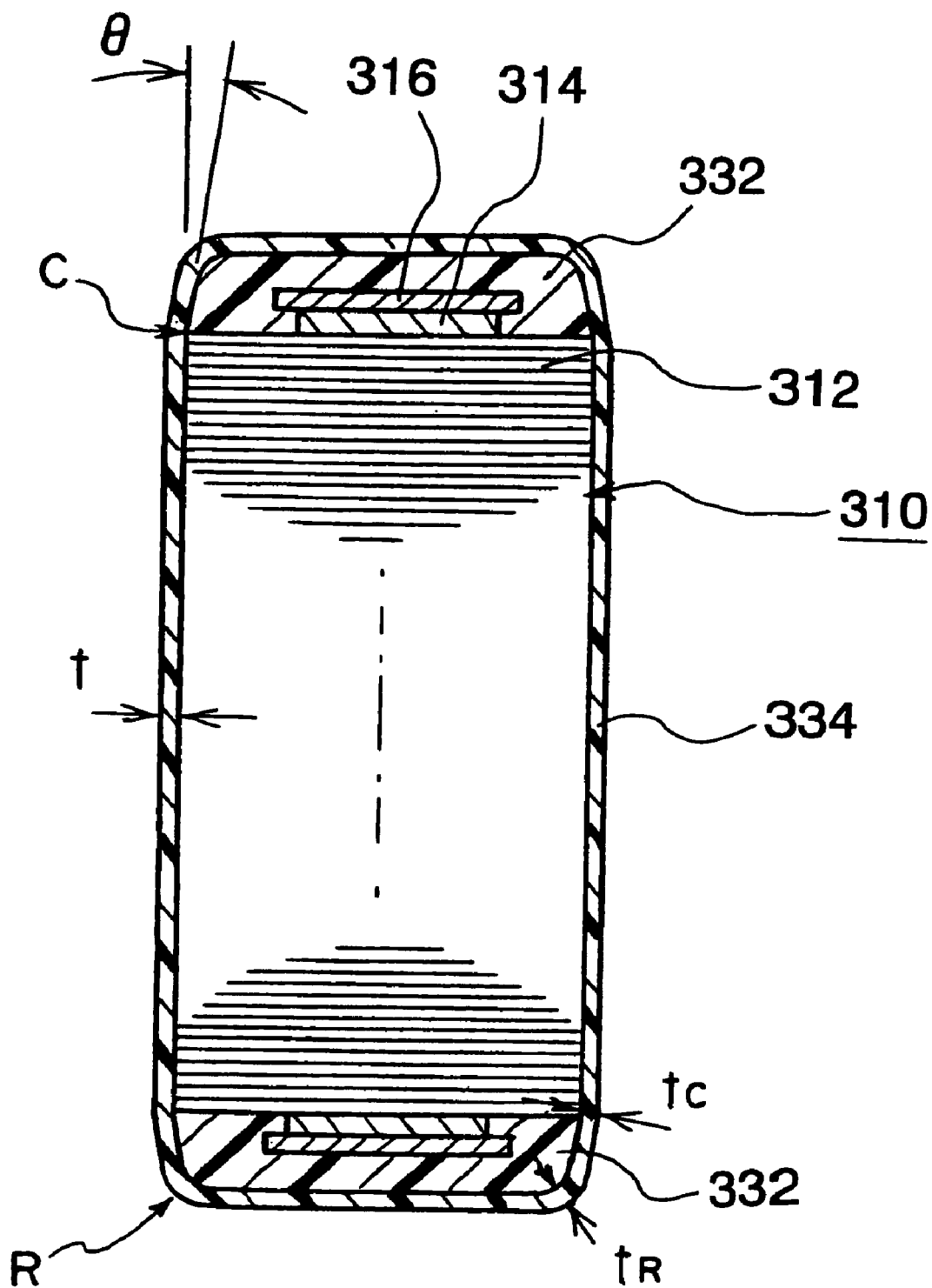
FIG. 8 is a cross-sectional view illustrating a magnetic pole piece of a completed stator core.

Referring to FIG. 8, a resin cap 332 is formed as a rounded end forming member on the ends of the stator core body 310 formed of laminated magnetic steel plates 312. The first connection plate 314 and the second connection plate 316 intrude into the cap 332, so that the cap 332 can be certainly joined on the end surface of the stator core body 310. According to the present invention, each of the connection plates 314 and 316 is thicker than each magnetic steel plate 312. However, the thickness of each connection plate can be the same as that of the magnetic steel plate 312 or smaller. In this embodiment, the difference in width between the first connection plate 314 and the second connection plate 316 forms the constricted part. If the cap 332 is sufficiently joined with the stator core body 310, it is unnecessary to form the constricted part. The structure with no constricted part can provide the smooth insulating layer 334 without any unevenness between the cap 332 and the magnetic steel plates 312. The insulating layer 334 is coated over the entire surface of the stator core body 310 on which the caps 332 are formed.

Figure 9:
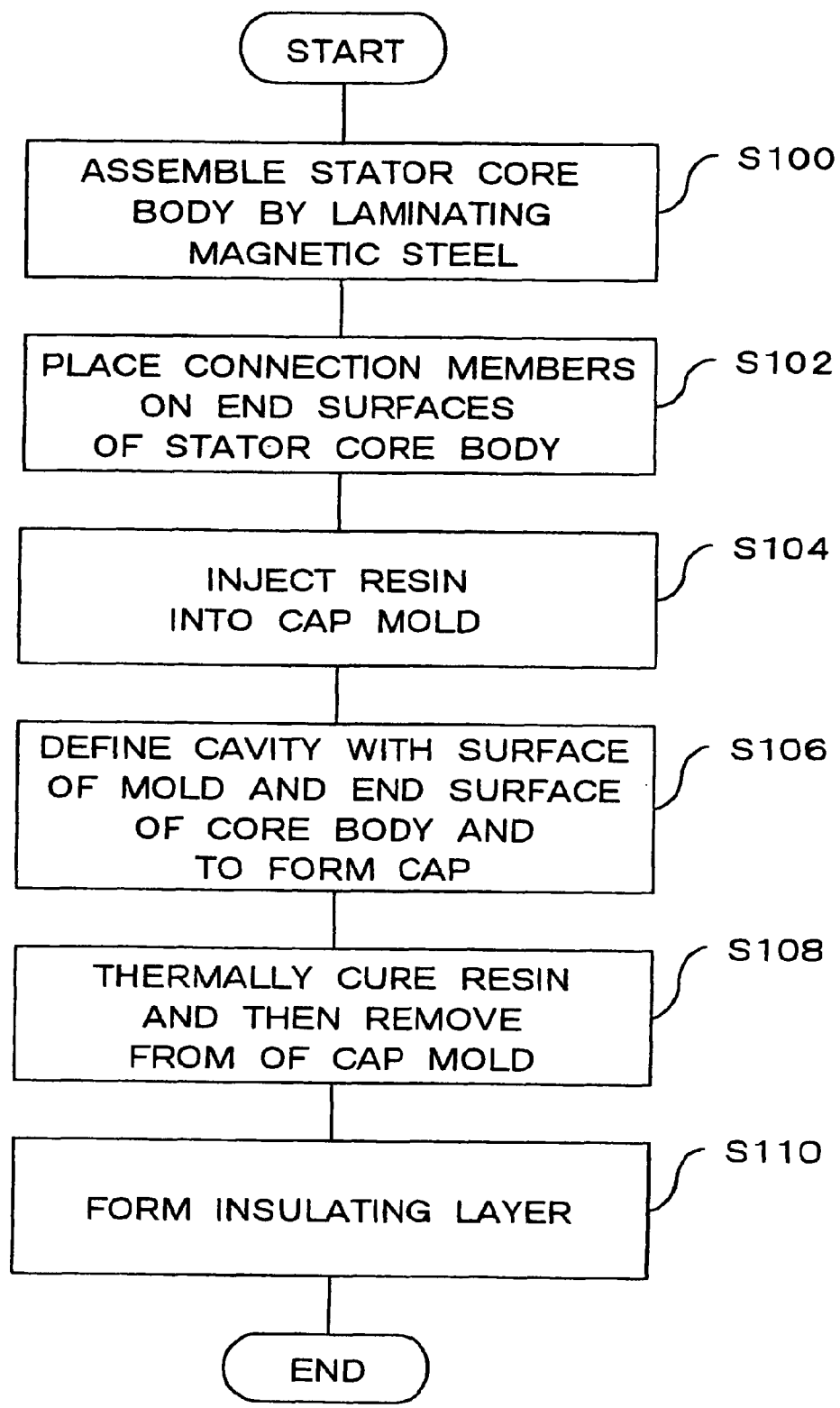
FIG. 9 is a flowchart showing a method of fabricating a stator core according to the fourth embodiment.

FIG. 9 is a flowchart of a stator core fabricating method according to the fourth embodiment. First, a stator core body 310 is built by laminating magnetic steel plates 312 as shown in FIG. 5 (S100). Connection members are disposed on the ends of the stator core body 310 to securely couple the core body 310 and the caps 332 (FIG. 8) (S102). In the connection member, the part corresponding to each pole piece of the core body 310 has a smaller outline. The caps 332 described below are respectively disposed so as to cover the connection members. In the present embodiment, the connection member is formed of the first connection plate 314 and the second connection plate 316.

Figure 10:
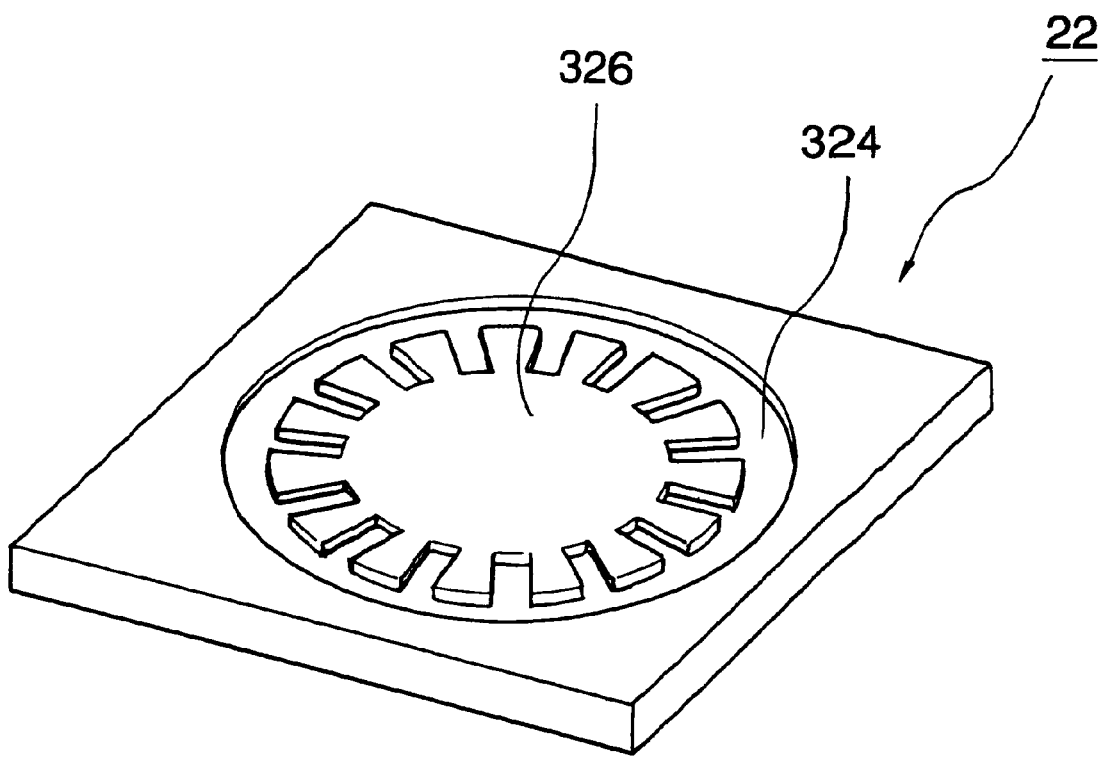
FIG. 10 is a perspective view schematically illustrating the structure of a cap molding tool.

Next, the cap 322 is formed by using the cap molding tool 322 shown in FIG. 10. A recess 324 in the same pattern as that of the magnetic steel plate 12 is formed on the upper surface of the cap molding tool 322. A predetermined amount of a resin material solution is poured into the recess 324 (S104). This resin material has a sufficient heat resistant property to temperatures in operation of a motor. The stator core body 310 is dipped on the resin material filled in the cap molding tool 322. Thus, a cavity is defined by the recess 324 of the cap molding tool 310 and the end of the stator core body 310. A sufficient amount of the resin material solution with which the cavity is filled is poured before the stator core body 310 is placed, so that the cavity can be occupied with it. Finally, the cap 332 is formed (S106).

Figure 11:
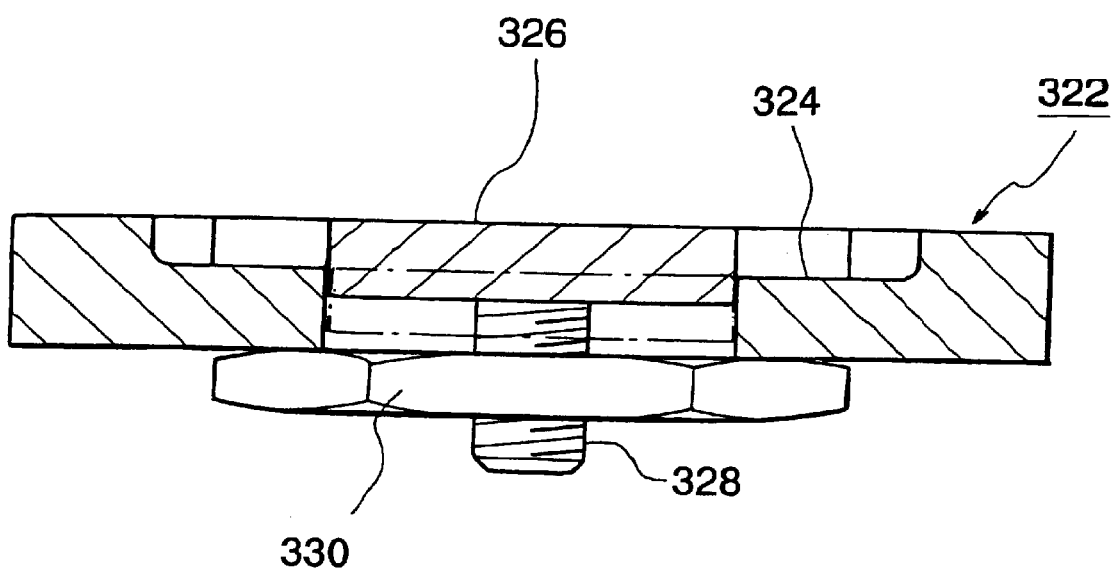
FIG. 11 is a cross-sectional view illustrating the cap molding tool shown in FIG. 10.

In such a state, the resin material is thermally cured. In the present embodiment, a method of preparing a thermoset resin as the resin material and rising it to the thermoset temperature is preferably used as the curing method. When the resin has been thermally cured, the intermediate product is released from the molding tool (S108). The releasing step can be easily performed by pulling down the protruding part 326 of the cap molding tool 322 (FIG. 10). A screw rod 328, as shown in FIG. 11, is mounted on the lower surface of the center protruding part 326 of the cap molding tool. A nut 330 is screwed to the screw rod 328 and is in contact with the lower surface of the cap molding tool 322. Hence, the center protruding part 326 can be pulled down by turning the nut 330. This cap forming step is applied to the opposite end surface of the stator core body 310.

Next, an insulating layer is applied on the surface of the stator core body 310 on which caps are formed (S110).

First, a solution of a resin material forming an insulating layer is poured into a dipping vat. The dipping vat is placed in a vacuum chamber for deaeration. The deaeration process releases bubbles in the solution, thus preventing formation of minute voids or so-called pinholes in the insulating layer due to bubbles. The stator core body 310 heated at a predetermined temperature is first immersed into the dipping vat and then removed. The stator core body 310 heated boosts the temperature of the solution of the resin material around it so that the viscosity of the solution is reduced. In such a manner, when the stator core body 310 is removed, adhesion of extra solution to the stator core body 310 is avoided. A large amount of pickup causes a sag in solution when the resin material solution is thermally cured, thus wasting resin material and soiling the working area. The present embodiment solves such problems. Since when the stator core body 310 is heated, only the resin material around it rises, no substantial rise in temperature of the solution in the dipping vat occurs. This can prolong the serviceable life (pot life) of the resin material in the dipping vat. The stator core body 310 lifted from the dipping vat is heated to the curing temperature of the resin material to form an insulating layer on the surface thereof.

Figure 12:
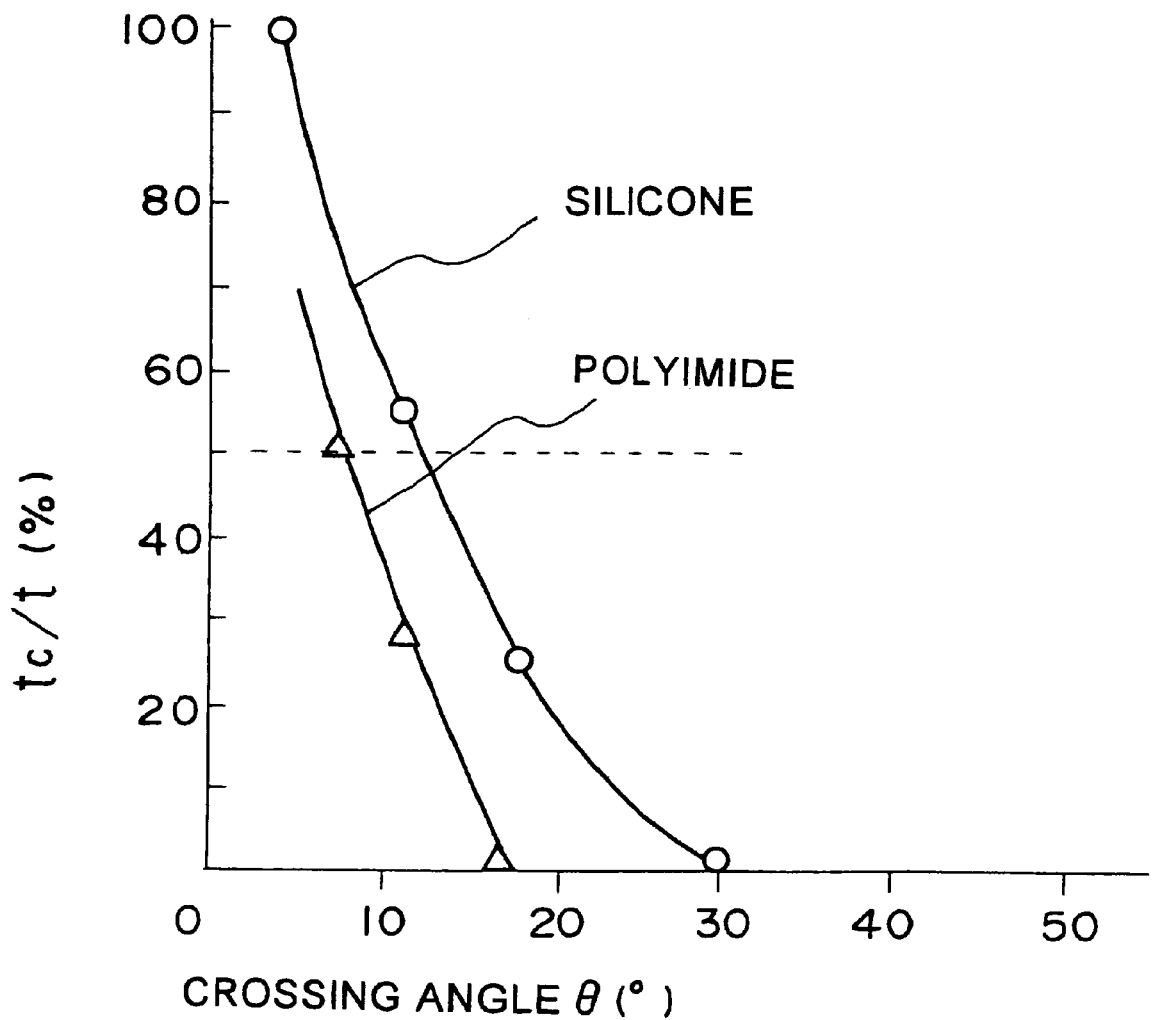
FIG. 12 is a graph plotting the relationship between crossing angle q and insulating layer thickness in FIG. 8.

The cap 332 can be variously shaped in the pattern of the cap molding tool. However, a preferable shape is selected in terms of ease of release from the molding tool and easiness of formation of the insulating film 334. It is preferable that the crossing angle q at the junction point (indicated with C in FIG. 8) where the stator core body 310 and the cap 332 intersect is more than 3° because of ease of release from a molding tool. A large crossing angle q causes insufficient adhesion of the resin material at the junction point, thus thinning the resultant insulating layer 334, so that electric insulation cannot be sufficiently secured between the stator core and the conductors. FIG. 12 shows the relationship between crossing angle q and ratio (tc/t) of thickness tc of the insulating layer 334 at the junction point to thickness t of the insulating layer 334 on the flat portion. Referring to FIG. 12, in order to obtain the ratio (tc/t) of 0.5, the crossing angle is set to less than about 13° in the case of silicone resin while the crossing angle is set to less than about 80 in the case of the case of polyimide resin. Hence, the crossing angle q is preferably set to more than 3° and less than 8° at the junction point C.

Figure 13:
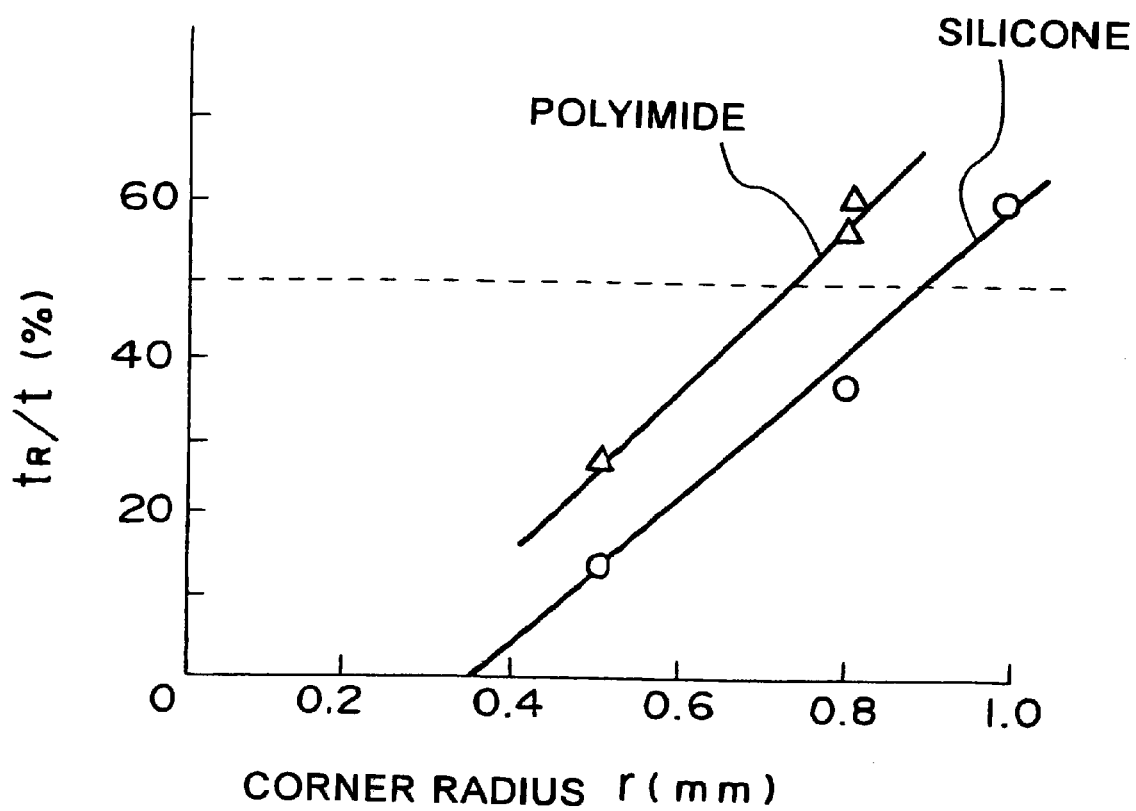
FIG. 13 is a graph showing the relationship between corner angle r and insulating layer thickness in FIG. 8.

When the radius of the corner R is small, the insulating layer 34 is thinned like the thickness at the above-mentioned junction point, so that a sufficient insulation property cannot be secured in some cases. FIG. 13 shows the relationship between corner radius r and ratio (tR/t) of thickness of the insulating layer 34 on the corner to thickness of the insulating layer 34 on the flat surface. In order to obtain the ratio (tR/t) of 0.5, the radius r of the corner R is set to more than about 0.9 mm in the case of silicone resin while the radius r of the corner R is set to more than about 0.8 mm in the case of polyimide resin. Hence, the radius r of the corner R is preferably set to more than 0.9 mm. Since the corner R is formed on the cap 332, the cap 32 of an insulating resin does not produce any trouble even when the insulating layer 34 is thinly formed. Hence, in that case, the insulating layer 34 can be set to more than 0.4 mm.

As described above, the insulating layer over the whole of the stator core, particularly on the insulating layer on the edge thereof can be securely formed by disposing a cap of which the shape can be relatively flexibly selected, so that the insulating paper can be omitted. Compared with the case where the insulating paper is inserted, the use of the cap improves the thermal conductivity and allows a motor to run under severe conditions.

Furthermore, although in the description of the present invention, the stator has been applied to the so-called internal rotation-type motor in which a rotor is disposed inside the stator, the stator according to the present invention can also be applied to the external rotation-type motor or linear motor in which a rotor is disposed outside the stator.

What is claimed is:

1. A stator for an electric motor, comprising:

a stator body formed of magnetic steel plates, each of said magnetic steel plates comprising teeth and grooves arranged in a comb-like pattern inside thereof, said magnetic steel plates being laminated so as to align said teeth and said grooves thereof;

coils respectively inserted into slots formed by grooves continuously laminated in said stator core body; and rounded edge forming members disposed on end surfaces in the laminated direction of said stator core body, each of said rounded edge forming members having an elongated surface substantially extending without a difference in level from the inner surface of each of said slots, a flat end surface, and a rounded edge surface with a predetermined curvature radius which smoothly joins said elongated surface with said flat end surface, and which is formed in a protruded pattern with respect to said slot.

2. The stator defined in claim 1, said stator core body and said rounded edge forming member are coated with an insulating layer at least at portion where said stator core body and said rounded edge forming member are in contact with said coil.

3. The stator defined in claim 1, wherein each of said rounded edge forming members comprises a plate member having the same cross section as each magnetic steel plate perpendicularly and axially and including a rounded edge surface at the end of the said elongated surface.

4. The stator defined in claim 1, wherein each of said rounded edge forming members has a parallel portion being in parallel to said magnetic steel plates and a brim portion being nearly perpendicular to said parallel portion and extending toward the center portion of said stator core body, and wherein said stator core body has grooves which receives said brim portion at a portion corresponding to said brim portion, and wherein said brim portion continues substantially and smoothly along the inner surface of each of said slots.

5. The stator defined in claim 1, further comprising connection members disposed on the ends of said stator core body, each of said connection members having teeth each smaller than each of pole pieces formed of said laminated teeth in said comb-like pattern and shaped in a similar comb-like pattern to that of each of said magnetic steel plates; and wherein said rounded edge forming member covers each of said connection members.

6. The stator defined in claim 5, wherein said connection member comprises:

a plurality of first connection plates disposed on the ends of said stator core body, said first connection plates having teeth each smaller than said pole pieces formed of said laminated teeth and shaped in a similar comb-like pattern to that of each of said magnetic steel plates; and a plurality of second connection plates disposed further outside said first connection plates, said second connection plates having teeth each smaller than each of said pole pieces and larger than the teeth of said first connection plates, and shaped in a similar comb-like pattern to that of each of said magnetic steel plates.

7. The stator defined in claim 5, wherein said round edge forming member is formed of an insulation material.

8. An electric motor having a stator core, said stator core comprising:

a stator core body formed of magnetic steel plates, each of said magnetic steel plates having teeth and grooves arranged in a comb-like pattern inside thereof, said magnetic steel plates being laminated so as to align said teeth and said grooves;

coils respectively inserted into slots formed by grooves continuously laminated in said stator core body; and rounded edge forming members disposed on end surfaces in the laminated direction of said stator core body, each of said rounded edge forming members having an elongated surface substantially extending without a difference in level from the inner surface of each of said slots, a flat end surface, and a rounded edge surface with a predetermined curvature radius which smoothly joins said elongated surface with said flat end surface, and which is formed in a protruded pattern with respect to said slot.

* * * * *